Oct. 7, 1947.  R. F. BRANDOM  2,428,735
COFFEE OR COCKTAIL TABLE
Filed Dec. 19, 1944    3 Sheets-Sheet 1

Inventor
REGINALD F. BRANDOM

By *Clarence A. O'Brien*
and *Harvey B. Jacobson*
Attorneys

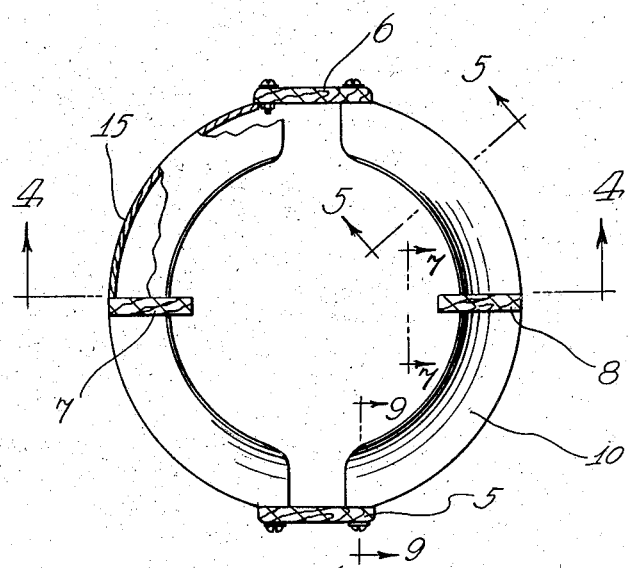
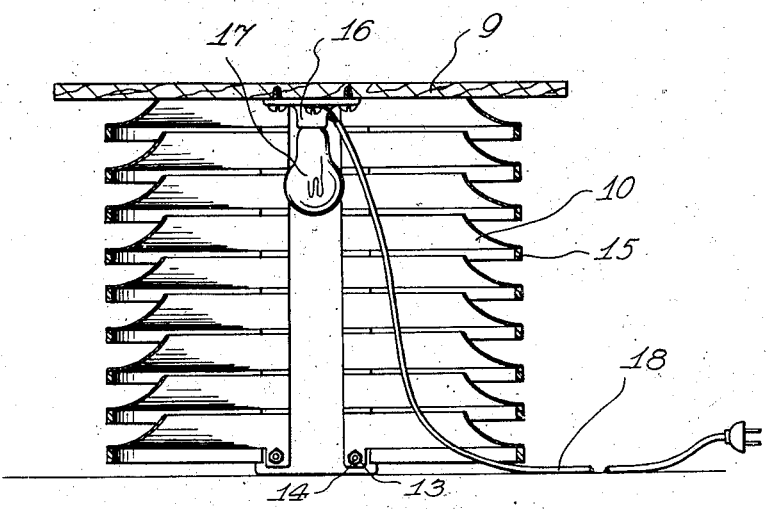
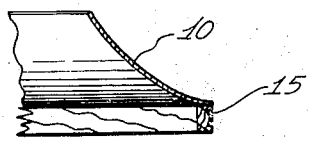

Oct. 7, 1947.  R. F. BRANDOM  2,428,735
COFFEE OR COCKTAIL TABLE
Filed Dec. 19, 1944  3 Sheets-Sheet 3

Inventor
REGINALD F. BRANDOM

By Clarence A. O'Brien
and Harvey B. Jacobson
Attorneys

Patented Oct. 7, 1947

2,428,735

UNITED STATES PATENT OFFICE 2,428,735

COFFEE OR COCKTAIL TABLE

Reginald F. Brandom, Oklahoma City, Okla.

Application December 19, 1944, Serial No. 568,833

1 Claim. (Cl. 240—4)

The present invention relates to a new and useful improvement in tables of a type commercially known as coffee or cocktail table, and the invention has for its primary object to provide a circular or drum-like table of this character having its wall formed of vertically spaced reflectors, together with illuminating means on the interior of the table to improve the utility and attractiveness of the table.

A further object is to provide an article of this character of simple and practical construction, which is neat and attractive in appearance, relatively inexpensive to manufacture, otherwise well adapted for the purposes for which the same is intended.

Other objects and advantages reside in the details of construction and operation as more fully hereinafter described and claimed, reference being had to the accompanying drawings forming part hereof, wherein like numerals refer to like parts, throughout, and in which:

Figure 3 is a transverse sectional view taken substantially on a line 3—3 of Figure 1.

Figure 4 is a vertical sectional view taken substantially on a line 4—4 of Figure 3.

Figure 5 is a fragmentary sectional view through one of the reflectors taken substantially on a line 5—5 of Figure 3.

Figure 1:
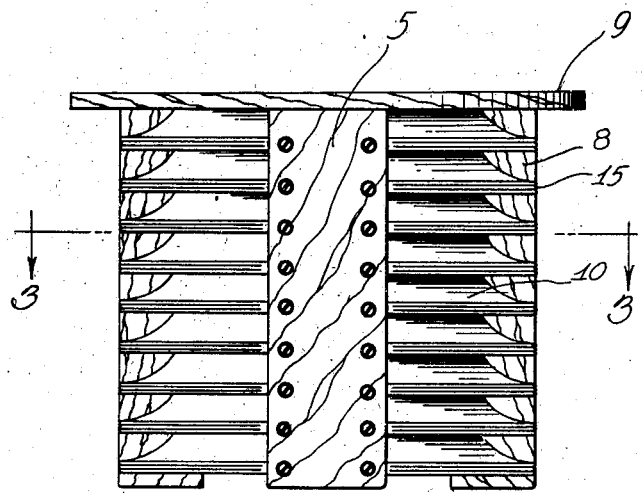
Figure 1 is a view in elevation showing one side of the table.
Figure 2:
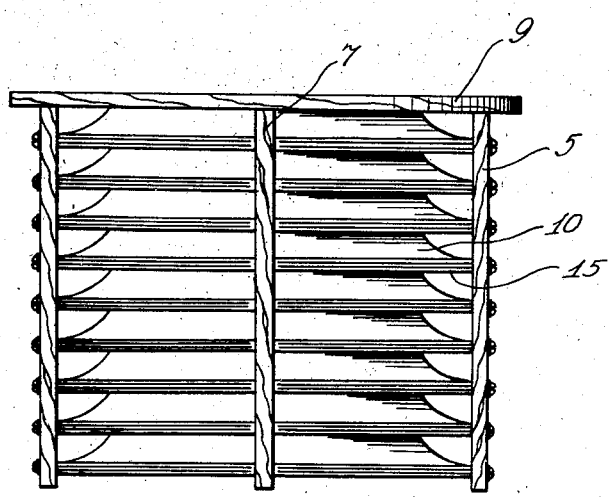
Figure 2 is a similar view showing another side of the table.
Figure 6:
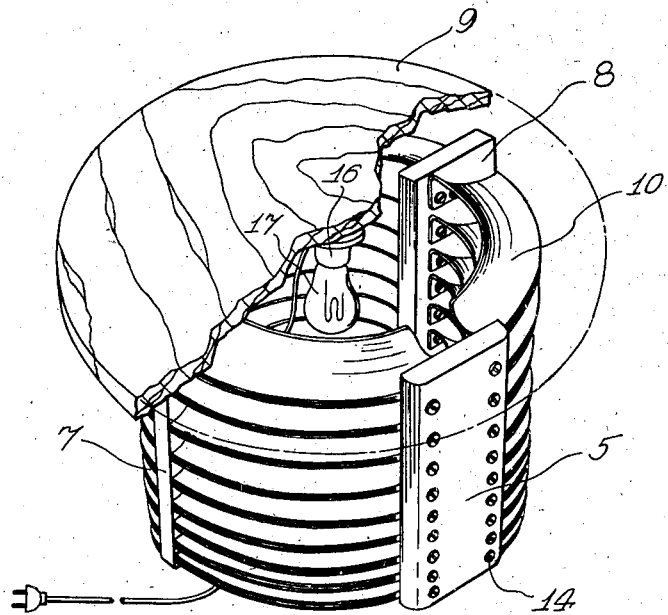
Figure 6 is a perspective view with parts of the table top broken away and shown in sections.

Referring now to the drawings in detail, wherein for the purpose of illustration, I have disclosed a preferred embodiment of the invention. The numerals 5 and 6 designate a pair of legs which may be constructed of wood, plastic, metal or other suitable material and are substantially rectangular shape with one surface of the legs positioned outwardly and the legs being positioned at diametrically opposite sides of the table.

A second pair of legs are designated at 7 and 8 and are likewise substantially rectangular in form and arranged with their surfaces extending substantially radially of the table so that the surfaces of all the legs are substantially parallel as shown in Figure 3 of the drawings.

A circular top 9, likewise of wood or other suitable material, is supported on top of the legs and secured thereto in any suitable manner.

A plurality of horizontally arranged vertically spaced arcuate reflectors 10 of light weight metal, plastic or other suitable material, each have a flange 11 at one end attached to the surface of one of the legs 7 or 8 by means of bolts or screws 12 while the other end of the reflectors are formed with tongues 13 attached to the inner surfaces of the legs 5 or 6 by means of bolts 14.

Figures 7, 8:
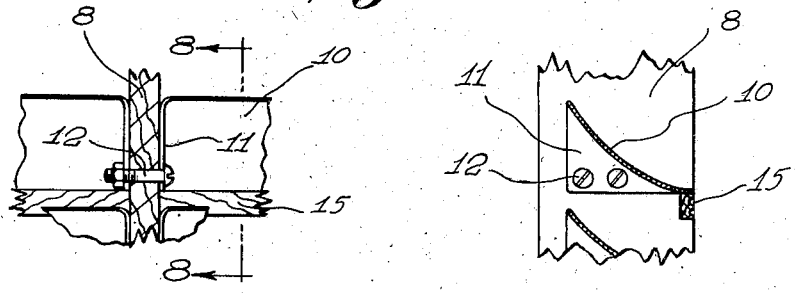
Figure 7 is a fragmentary sectional view taken substantially on a line 7—7 of Figure 3.
Figure 8 is a sectional view taken substantially on a line 8—8 of Figure 7.
Figure 9:
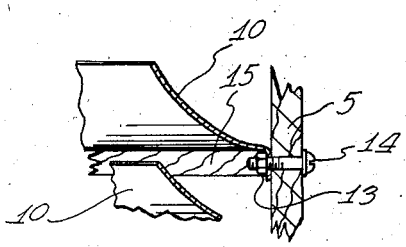
Figure 9 is a fragmentary detail sectional view taken on the plane of the line 9—9 of Figure 3.

The reflectors 10 have their surfaces curved upwardly and inwardly substantially in concavo-convex form and to the under-side of the outer edges of the reflectors are suitably attached short skirts 15. The skirts 15 extend downwardly below the horizontal plane of the upper inner edge of an adjacent lower reflector as shown more clearly in Figures 8 and 9 of the drawings.

A lamp base 16 is secured to the under-side of the table top 9 and adapted for mounting a lamp 17 therein for supporting the lamp in a downwardly extended position from the top of the table. An extension cord 18 is attached to the lamp base for connection with a house circuit in the usual manner.

As shown in Figure 4 of the drawings the upper edge of the uppermost reflectors contact the under-side of the table top 9 while the skirt 15 of the lowermost reflectors are spaced above the surface of the floor.

It will be apparent that the table top, legs and reflectors may be painted or colored in any suitable manner according to the individual taste and to produce a desired illuminated effect by means of the lamp 17 mounted at the interior of the table and light from which is reflected outwardly through the side by means of and between the reflectors 10.

By arranging the reflectors in overlapping relation direct the rays of the lamp 17 is obstructed.

It is believed that the details of construction, and manner of use of the device will be readily understood from the foregoing without further detailed explanation.

Having thus described the invention what I claim is:

A table comprising a plurality of legs and a table-top supported thereon, a plurality of horizontally extending vertically spaced series of arcuate reflectors arranged in a circle in each series and having their ends attached to the legs, said reflectors having inner edges curved upwardly, skirts depending from the outer edges of the reflectors below the inner edges of subjacent reflectors, and illuminating means mounted inwardly of the reflectors, said series, together with said legs, forming an annular internally lit structure hiding the illuminating means and with circumferential light-emitting slots therein.

REGINALD F. BRANDOM.

REFERENCES CITED

The following references are of record in the file of this patent:

UNITED STATES PATENTS

| Number | Name | Date |
|---|---|---|
| D. 35,728 | Estes | Feb. 11, 1902 |
| 2,135,311 | McKinney | Nov. 1, 1938 |
| 2,305,214 | Williams | Dec. 15, 1942 |
| 1,846,878 | Kopp | Feb. 23, 1932 |